April 17, 1951 F. E. OAKHILL 2,548,998
FILM FEEDING MEANS FOR PRINTING MACHINES
Original Filed Dec. 2, 1944 3 Sheets-Sheet 1

Inventor:
Frederic E. Oakhill
By Hill & Hill
Attys.

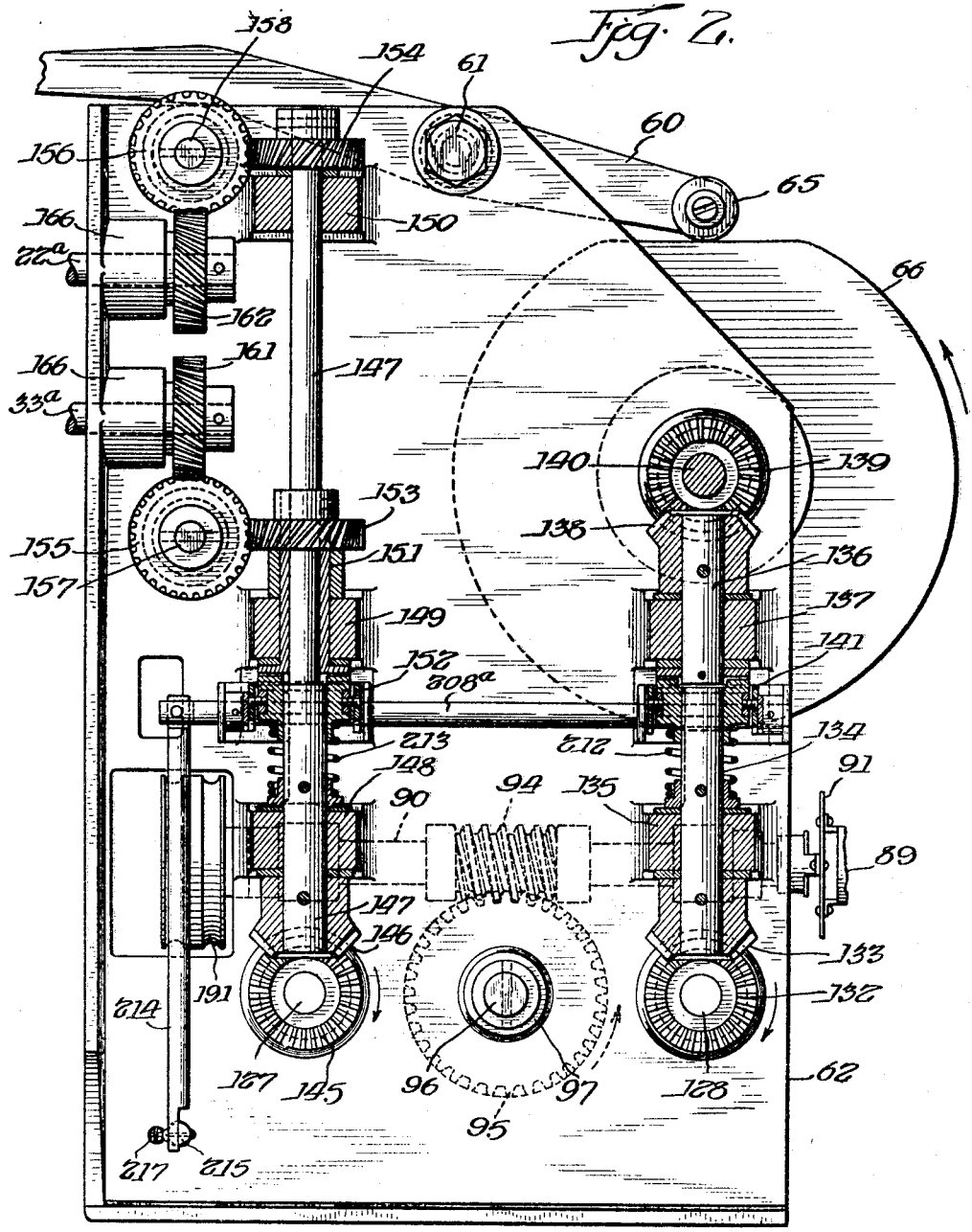

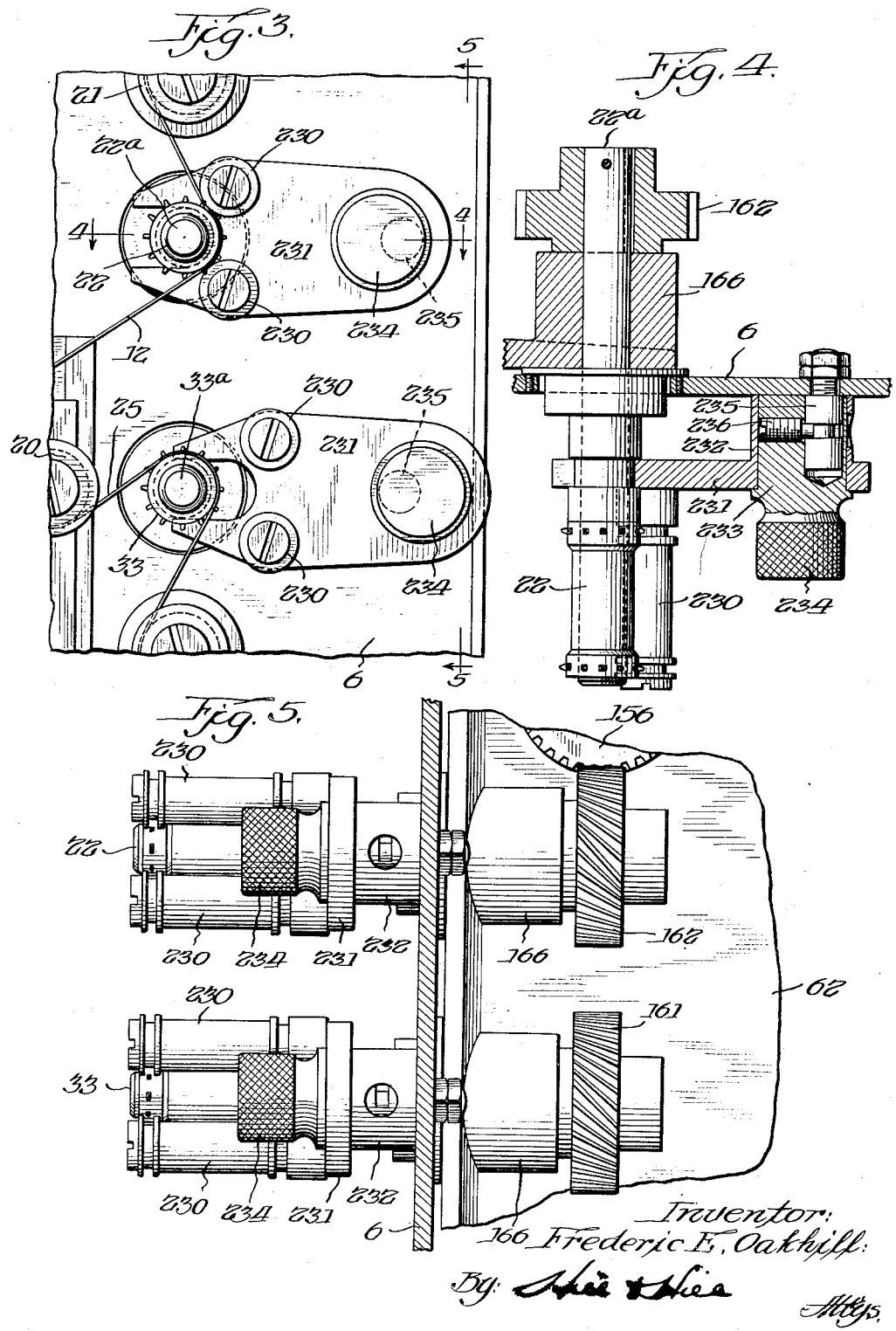

Patented Apr. 17, 1951

2,548,998

UNITED STATES PATENT OFFICE 2,548,998

FILM FEEDING MEANS FOR PRINTING MACHINES

Frederic E. Oakhill, Wilmette, Ill., assignor to Prismacolor, Inc., Chicago, Ill., a corporation of Illinois Original application December 2, 1944, Serial No. 566,310. Divided and this application November 10, 1945, Serial No. 627,820

5 Claims. (Cl. 95—75)

This invention relates to improvements in photographic film printing machines, and more particularly to machines for printing groups of impressions carried by a negative film which has been exposed in what may be called a three-color camera, although two-color or other multi-color films may be printed with the present machine with slight changes.

The subject matter of the present application has been divided out of my pending application, Serial No. 566,310, filed December 2, 1944, now Patent 2,515,420, for an improvement in Film Printing Machines.

Upon the negative film are photographed groups of black and white images of an objective or many objectives. The individual images of each group are called "frames" since the images of each group are equally spaced apart by more or less opaque bars and likewise the groups of frames are equally spaced apart by opaque bars. These bars are desirable but not absolutely necessary. Films printed with the present machine are permanent, fixed and a true record.

In accordance with the present invention, the positive and negative films are advanced through a printing zone in a step by step manner and are permitted to remain quiescent during the printing operation.

One of the objects of the present invention is the provision of gearing for intermittently advancing the films in conjunction with gearing for operating the control means for exposing the films to light sources.

Another object is the provision of means whereby to facilitate the threading of the positive and negative films through certain film advancing sprockets.

Other objects and advantages will appear in the course of this specification, and with all of said objects and advantages in view, this invention consists in the several novel features of construction, arrangement and combination of parts hereinafter fully set forth and more particularly defined in the appended claims.

The invention is clearly illustrated in the drawings accompanying this specification, in which:

Fig. 2 is a view partly in side elevation and partly in vertical section taken along the axes of two upright shafts which comprise part of the film mechanism, the view being taken in a direction opposite to that seen in Fig. 1;

Fig. 3 is a front elevation of two film sprockets and associated film retainers for holding the films in contact with the sprockets, one of the film retainers being shown in its retracted position;

Fig. 4 is a horizontal section taken on the line 4—4 of Fig. 3, and

Fig. 5 is a view partly in side elevation of the mechanism seen in Fig. 3, and partly in vertical cross section taken on the line 5—5 of Fig. 3.

Figure 1:
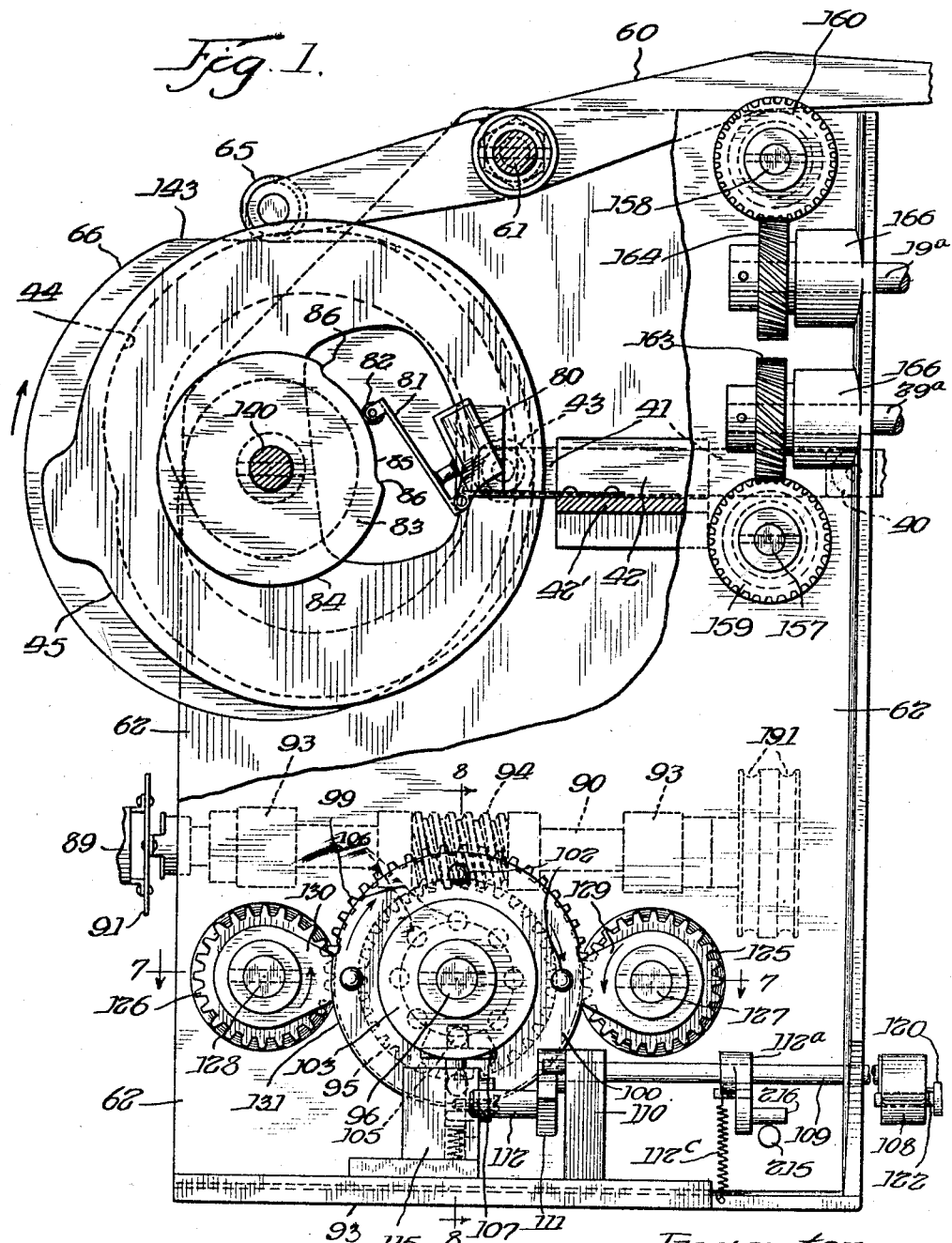
Fig. 1 is a side elevation, partly broken out illustrating certain elements of the film feeding mechanism.

Only such mechanism as relates to the present invention is illustrated in the accompanying drawings, but the entire machine is shown and described in its entirety in the parent application from which the instant application has been divided.

Referring now to said drawings which are merely illustrative of one embodiment of the invention, a frame structure is provided upon which the several instrumentalities are mounted. Mounted upon the front end of the frame structure is a panel 6 (see Figs. 4 and 5) upon which various instruments are mounted.

In Fig. 3 is shown a fragment of a positive film 12 and a fragment of the negative film 25. These films are trained around idlers and around driving sprockets, two of which are shown at 22, 33.

As will be hereinafter explained the sprockets are driven synchronously at equal speed by suitable gearing so that the positive and negative films are advanced simultaneously in an intermittent manner and permitted to remain stationary during the printing interval.

Mounted on a base carried by the lower frame member of the frame structure is an electric motor (not shown) having a suitable speed reducing gearing from which extends the main drive shaft 89 of the machine. To the main drive shaft is coupled a drive shaft 90 by a shaft coupling 91. The drive shaft 90 is journaled in bearing brackets 93 mounted on one of the two upright supporting frames 62. A reel winding drum 191 is mounted on the shaft 90, but as this drum forms no part of the present invention, further description of the same is believed unnecessary.

Mounted on the drive shaft 90 is a worm pinion 94 which meshes with a worm pinion 95 that is mounted on a counter shaft 96 which is journaled in bearing bosses carried by the upright supporting frames 62.

The shaft 96 drives a mutilated gear wheel 99. This mutilated gear wheel 99 alternately drives the film advancing mechanism and reciprocates the light controlling gate mechanism and oscillates the lever which raises and lowers the fogging light housing (not shown). A clutch may be provided between the shaft 96 and mutilated gear 99, one member 100 of the clutch being fastened to the mutilated gear wheel 99 by rivets 102 and coacts with a clutch member 103, fastened upon the shaft 96. The clutch may be of the conventional unidirectional clutch construction which may be set for continuously driving the mutilated gear wheel, or for rotating the same through one complete revolution and then unclutching the clutch, whereby the mutilated gear wheel and all of the mechanisms driven by it will remain idle until the clutch is again reclutched.

One clutch member carries a retractible bolt 105 which is arranged to be thrust into any one of a number of sockets 106 in the clutch member 103. A retractible shoe 107 having a tapered edge cooperates with the bolt to withdraw it from engagement in the socket in which it is engaged to thereby unclutch the clutch.

The shoe 107 is mounted in a post 115 secured to and extending upward from lower members of the frame structure. The shoe is set into its operative or inoperative position from a hand lever 108 disposed adjacent the panel 6. The hand lever is fastened to a rod 109 rotatably mounted in the panel 6 and in a post 110 secured to and extending up from the lower frame member of the frame structure. On the end of the rod 109 is secured a crank arm 111 from which projects a stud or pin 112 which operates to depress the shoe 107.

The hand lever 108 is provided with a spring pressed bolt 120 which engages in a hole in the panel 6 whenever the hand lever is swung into its down position for a continuous operation of the machine. The bolt is held in its retracted position by a pin 122 which strikes against the face of the hand lever when the machine is to be operated intermittently.

On the rod 109 is mounted a rock lever 112a, one arm of which is connected by a coiled tension spring 112c with a stationary element, and functions to yieldably hold the rod 109 and the parts carried thereby in inoperative position.

Inasmuch as the clutch mechanism and the lever for operating the same forms no part of the present invention, a fuller description thereof is thought unnecessary so far as this specification is concerned.

The mutilated gear wheel 99 has teeth upon approximately 180 degress of its circumference which teeth are arranged to mesh alternately with the teeth of two pinions 125, 126 so that during one complete revolution of the mutilated gear wheel, in one half of its revolution it rotates one pinion while the other pinion remains idle, and in the other half of its revolution it rotates the previously idle pinion and permits the other one to remain idle. Thus the pinions 125, 126 are each given one complete revolution each time they are rotated.

While the number of teeth on the mutilated gear wheel 99 and pinions 125, 126 may be varied, so long as revolution of the mutilated gear wheel through an arc of 180° rotates a pinion through 360°, the number of teeth shown accomplishes this result. The mutilated gear wheel shown has 21 teeth, and each pinion has 24 teeth. This enables the last tooth of the mutilated gear wheel, which meshes with the teeth of the pinion 126, to become demeshed from the teeth of the pinion 126 at the time the first tooth of the mutilated gear wheel becomes meshed with the teeth of the pinion 125. At the end of the rotation of the mutilated gear wheel through an arc of 180°, the last tooth of the mutilated gear wheel runs out of mesh with the teeth of the pinion 125. As a result, each pinion is given a complete revolution by the gear wheel during a rotation of 180° thereof.

The pinions 125, 126 are mounted on counter shafts 127, 128 journaled in bearing bosses carried by the upright plates 62 and are bolted or otherwise fastened to detents 129, 130 rigidly fastened to the counter shafts 127, 128 by pins or the like which pass through hubs formed on said detents and through the shafts. The end edges of the detents are concaved along circular lines struck from the center of the counter shaft 96 (see Fig. 1) and are arranged to engage the circular edge of a disc-like member 131 formed on one member of the clutch member 100 and thereby positively prevent accidental rotation of the pinions 125, 126 and their shafts except when driven by the mutilated gear wheel.

The counter shaft 128 actuates the light controlling gate mechanism and the fogging light housing actuating mechanism, and the counter shaft 127 drives the film advancing mechanism through gearing and drive mechanism which will be presently described.

Mounted on one end of the counter shaft 128 is a mitre pinion 132 (see Fig. 2) which meshes with a mitre pinion 133 mounted upon an upright shaft 134 journaled in a bearing bracket 135 carried by the upright plate 62. Coupled to the shaft 134, as by a shaft coupling 141, is an upright shaft 136 which is journaled in a bearing bracket 137 carried by the upright plate 62. Rigidly secured to the shaft 136 is a mitre pinion 138 which meshes with a mitre pinion 139 fast on the cam shaft 140 which is journaled in bearing bosses on the upright plates 62. Mounted on said cam shaft 140 are the three cam blocks 45, 66 and 83. The cam block 45 has the cam groove 44 which cooperates with the roller 43 carried by the rod or bar 41 to reciprocate the light controlling gate (not shown). The cam groove is shaped to reciprocate the light controlling gate back and forth once during each complete revolution of the cam shaft 140.

The cam block 66 raises and lowers the fogging light housing (not shown) once during each revolution of the cam shaft. Its cam face is circular throughout its greatest extent and has a flattened portion 143 which cooperates with the roller 65 of the lever 60 to permit the roller 65 to move downward, thereby permitting a spring to raise the forward end of the lever 60. The timing of the cam 66 is such that the fogging light lamp housing is raised during the intervals that the films are being advanced.

*Film advancing mechanism*

On one end of the counter shaft 127 is a mitre pinion 145 which meshes with a mitre pinion 146 pinned, or otherwise rigidly secured to an upright shaft 147 which is journaled in bearings 148, 149, 150 carried by one of the plates 62.

Rotatively mounted in the bearing bracket 149 is a sleeve 151, the lower end of which is provided with a coupling member of another shaft coupling 152 for coupling the sleeve 151 to the shaft 147. To the sleeve 151 is pinned, or otherwise rigidly secured a spiral gear 153, and to the upper end of the shaft 147 is rigidly secured a spiral gear 154. Meshing respectively with the spiral gears 153 and 154 are spiral gears 155, 156 mounted respectively on shafts 157, 158 journaled in bearing bosses carried by the upright plates 62. On the other ends of the shafts 157, 158 are spiral gears 159, 160.

The spiral gears 155, 156 mesh respectively with spiral gears 161, 162 pinned or otherwise rigidly secured to the shafts 33a, 22a for the negative and positive film advancing sprockets 33, 22 (see Figs. 3 to 5), and the spiral gears 159, 160 mesh respectively with spiral gears 163, 164 pinned or otherwise rigidly secured to the shafts 29a, 19a for the other film advancing sprockets.

The film advancing sprockets are thus provided with drive gearing which rotates all four sprockets in unison and at the same peripheral speed. The several sprocket shafts are journaled in bearing brackets 166 which project laterally from the upright supporting plates 62.

Safety means is provided for preventing actuation of the hand lever 108 for the main clutch except when the shaft couplings 141, 152 are fully clutched. As shown, said safety means comprises an arm 214 secured to a rod 208a, operatively connected with the shaft couplings 141, 152, the lower end of the arm 214 being connected to a horizontally extending rod 215 which is adapted to be projected underneath a pin 216 on the arm 112a. A complete description of the safety mechanism is shown and described in the parent application from which the present one has been divided and as it forms no part of the present invention it is believed that further description thereof is unnecessary so far as this specification is concerned.

Associated with the film driving sprockets are idlers 230 which positively hold the films in engagement with the sprockets. To facilitate threading the films between the sprockets and idlers 230, the idlers for each sprocket are mounted upon a retractible slotted arm 231 (see Figs. 3 to 5) which straddles a hub on the shaft 22a or 33a and is provided with a hub 232 that is rotatably mounted on a stud 233 which is provided with a knurled knob 234 and is rotatively mounted upon a pin 235 eccentrically disposed with respect to the axis of the stud 233 and secured to the panel 6 as by nuts. A threaded pin 236 is secured in the stud and has a reduced end which engages in a groove in the pin 235 and prevents accidental disconnection between the arm 231 and the pin 235. By rotating the knurled knob 234 upon the eccentric pin to the position seen in the lower half of Fig. 3, the arm 231 and therewith the idlers 230 are retracted from the sprocket permitting the film to be readily trained around the sprocket.

Having thus described my invention, it is obvious that various immaterial modifications may be made in the same without departing from the spirit of my invention; hence, I do not wish to be understood as limiting myself to the exact form, construction, arrangement and combination of parts herein shown and described or uses mentioned.

What I claim as new and desire to secure by Letters Patent is:

1. The combination in a film printing machine having a printing zone including a light source, of mechanism for intermittently advancing positive and negative films and for exposing the films to the same light source, said mechanism comprising a pair of alternately driven pinions, a pair of upright shafts and pinions thereon meshing with said alternately driven pinions, a cam shaft having mounted thereon a light controlling gate cam, a fogging light housing cam, and a fogging light switch cam, intermeshing pinions on said cam shaft and one of said upright shafts, film driving sprockets, and gearing for driving said sprockets having gearing connections with the other upright shaft, whereby the positive and negative films are advanced through the printing zone in a step by step manner, and are adapted to remain quiescent during the printing operation in which the light controlling gate cam, the fogging light housing cam, and the light switch cam are actuated.

2. The combination in a film printing machine having a printing zone including a light source, of mechanism for intermittently advancing positive and negative films and for exposing the films to the same light source, said mechanism comprising a mutilated gear wheel, a pair of pinions disposed diametrically opposite each other and adapted to alternately mesh with the teeth on the mutilated gear wheel one pinion at a time, shafts upon which said pinions are mounted, mitre gears one mounted on each shaft, two upright shafts, mitre gears on each of said upright shafts and meshing with said first mentioned mitre gears, a cam shaft having mounted thereon a light controlling gate cam, a fogging light housing cam, and a fogging light switch cam, operating mechanism actuated by said cams, intermeshing mitre gears between one of said upright shafts and said cam shaft, and film sprocket driving shafts and gearing between said other upright shaft and said film sprocket driving shafts, whereby the positive and negative films are advanced through the printing zone in a step by step manner, and are adapted to remain quiescent during the printing operation in which the light controlling gate cam, the fogging light housing cam, and the light switch cam are actuated.

3. The combination in a film printing machine having a printing zone including a light source, of mechanism for intermittently advancing positive and negative films and for exposing the films to the same light source, said mechanism comprising a speed reducing mechanism including a main drive shaft, a driven shaft, reduction gearing operatively connecting the drive and driven shafts, a mutilated gear wheel mounted on the driven shaft, clutch means interposed between the reduction gearing and the mutilated gear and adapted for intermittent and continuous operation, a pair of alternately driven pinions operatively connected to alternately mesh with the mutilated gear wheel, operator-operated means operatively connected to the clutch means whereby the clutch is adapted for either continuous or intermittent operation, a pair of upright shafts and pinions thereon meshing with said alternately driven pinions, a cam shaft having mounted thereon a light controlling gate cam, a fogging light housing cam, and a fogging light switch cam, operating mechanism actuated by said cams, intermeshing pinions on said cam shaft and one of said upright shafts, film driving sprockets and shafts therefor, and gearing on said other upright shaft and said film sprocket driving shafts, whereby the positive and negative films are advanced through the printing zone in a step by step manner, and are adapted to remain quiescent during the printing operation in which the light controlling gate cam, the fogging light housing cam, and the light switch cam are actuated.

4. The combination in a film printing machine having a printing zone including a light source, of mechanism for intermittently advancing positive and negative films and for exposing the films to the same light source, said mechanism comprising a pair of pinions, means for alternately rotating said pinions, a pair of upright shafts, shaft couplings including clutch means for each of said upright shafts, gearing between each pinion and one of said upright shafts, control means operatively connected to said pinions whereby the film printing machine is adapted for either continuous or intermittent operation, safety means operatively connected to the shaft couplings and said control means whereby actuation of the control means is prevented except where the shaft couplings are fully clutched, a cam shaft having mounted thereon a light controlling gate cam, a fogging light housing cam, and a fogging light switch cam, operating mechanism actuated by said cams, gearing between one of said upright shafts and said cam shaft, film driving sprockets and shafts therefor and gearing between said other upright shaft and the shafts for the film driving sprockets, whereby the positive and negative films are advanced through the printing zone in a step by step manner, and are adapted to remain quiescent during the printing operation in which the light controlling gate cam, the fogging light housing cam, and the light switch cam are actuated.

5. The combination in a film printing machine having a printing zone including a light source, of mechanism for intermittently advancing positive and negative films and for exposing the films to the same light source, said mechanism comprising a pair of alternately driven pinions, control means operatively connected to said pinions whereby the film printing machine is adapted for either continuous or intermittent operation, a cam shaft having mounted thereon a light controlling gate cam, a fogging light housing cam, and a fogging light switch cam, mechanism actuated by said cams, operative connections between one of said pinions and said cam shaft, film driving sprockets and shafts therefor and operative connections between said other pinion and the shafts for said film driving sprockets, and safety means operatively connected to the cam shaft, film drive shafts and said control means whereby actuation of said control means is prevented except when said cam shaft and film shafts are operative.

FREDERIC E. OAKHILL.

REFERENCES CITED

The following references are of record in the file of this patent:

UNITED STATES PATENTS

| Number | Name | Date |
|---|---|---|
| 1,271,156 | Givler et al. | July 2, 1918 |
| 1,748,390 | Otto | Feb. 25, 1930 |
| 2,019,929 | Pupke | Nov. 5, 1935 |
| 2,119,200 | Campbell | May 31, 1938 |
| 2,124,267 | Waibler | July 19, 1938 |
| 2,178,242 | Runge | Oct. 31, 1939 |
| 2,399,460 | Britton | Apr. 30, 1946 |